United States Patent
Zanghelli

(10) Patent No.: US 10,081,375 B2
(45) Date of Patent: Sep. 25, 2018

(54) WHEEL AXLE COMPRISING AT LEAST TWO PROTECTION DEVICES

(71) Applicant: ALSTOM TRANSPORT TECHNOLOGIES, Saint-Ouen (FR)

(72) Inventor: Patrick Zanghelli, Guereins (FR)

(73) Assignee: ALSTOM TRANSPORT TECHNOLOGIES, Saint-Ouen (FR)

( * ) Notice: Subject to any disclaimer, the term of this patent is extended or adjusted under 35 U.S.C. 154(b) by 183 days.

(21) Appl. No.: 15/189,802

(22) Filed: Jun. 22, 2016

(65) Prior Publication Data

US 2016/0375916 A1 Dec. 29, 2016

(30) Foreign Application Priority Data

Jun. 23, 2015 (FR) .................................. 15 55742

(51) Int. Cl.
| | |
|---|---|
| B61F 15/26 | (2006.01) |
| B60B 35/04 | (2006.01) |
| B60B 35/16 | (2006.01) |
| B60B 37/02 | (2006.01) |
| B60B 37/04 | (2006.01) |
| B61F 19/00 | (2006.01) |
| B60B 17/00 | (2006.01) |

(52) U.S. Cl.
CPC .............. B61F 15/26 (2013.01); B60B 35/04 (2013.01); B60B 35/16 (2013.01); B60B 37/02 (2013.01); B60B 37/04 (2013.01); B61F 19/00 (2013.01); B60B 17/00 (2013.01); *B60B 2310/306* (2013.01); *B60B 2310/307* (2013.01); *B60B 2900/212* (2013.01); *B60B 2900/3312* (2013.01); *B60Y 2200/30* (2013.01)

(58) Field of Classification Search
CPC ....... B60B 35/00; B60B 35/16; B60B 35/166; B60B 17/00; B61F 15/00; B61F 15/04; B61F 15/26; B61F 5/50
See application file for complete search history.

(56) References Cited

U.S. PATENT DOCUMENTS

2016/0297516 A1* 10/2016 Ganis ...................... B60B 35/04
2017/0096216 A1* 4/2017 Swank ................... B60B 35/025

FOREIGN PATENT DOCUMENTS

| DE | 202014002014 U1 | 3/2014 |
|---|---|---|
| EP | 2345491 A1 | 7/2011 |
| WO | 00/59764 A1 | 10/2000 |

OTHER PUBLICATIONS

International Search Report for FR 1555742 dated Apr. 18, 2016.

* cited by examiner

*Primary Examiner* — Jason R Bellinger
(74) *Attorney, Agent, or Firm* — Thompson Coburn LLP; Steven M. Ritchey

(57) ABSTRACT

A wheel axle for a vehicle, having a shaft extending along a main axis, a first protection device and at least one second protection device, each device having a body at least partially surrounding the shaft in a plane perpendicular to the main axis, the body having a first end portion and a second end portion, the end portions being opposite one another along their main axis. The first end portion of the first device at least partially surrounds the second end portion of the second device in a plane perpendicular to the main axis.

10 Claims, 2 Drawing Sheets

WHEEL AXLE COMPRISING AT LEAST TWO PROTECTION DEVICES

CROSS-REFERENCE TO RELATED APPLICATIONS

The present application is a non-provisional application claiming the benefit of FR 15 55742, filed Jun. 23, 2015, which is incorporated herein by reference in its entirety.

FIELD OF THE INVENTION

The present invention relates to a wheel axle for a vehicle, as well as a vehicle equipped with such a wheel axle.

BACKGROUND OF THE INVENTION

Many vehicles include one or more wheel axles mounted below a rigid chassis. Each wheel axle generally comprises two wheels each mounted at one end of a shaft, and frequently one or more brake discs and/or a speed reducer. In particular, rail vehicle trucks, such as locomotives or cars, comprise such wheel axles.

However, axles of this type, due to their placement below the chassis of the truck, are sometimes damaged by impacts. Indeed, in order to simplify the structure of the vehicles and facilitate the inspection and maintenance of the associated wheel axles and braking systems, the wheel axles are generally left exposed, i.e., they are not protected by a box.

In particular, in the case of rail vehicles, stones coming from the ballast of the track are likely to damage the wheel axle if they are projected against the shaft during the movement of the train. Such impacts could cause the appearance of surface flaws, which may lead to cracking, or even breaking of the shaft. When such flaws are detected, it is therefore frequently necessary to replace the wheel axle.

A device for protecting a wheel axle of a rail vehicle is known from document EP 2,345,491 A1. The device includes two shells surrounding the shaft of the wheel axle to protect it from impacts. However, such a protection device is specific to the wheel axle on which it is mounted. Indeed, the length of the device must be adapted to the length of the segment of the shaft that the device must protect. If a device of this type is mounted on a segment having a length greater than the length of the segment for which the device was designed, part of the shaft will not be covered and will therefore still be able to be damaged. Thus, for shafts with different lengths, different protection devices must be provided.

Furthermore, in addition to wheels, a wheel axle generally includes brake discs. These elements are supported by a same shaft, and divide the shaft into several segments. Yet all of the segments of the shaft do not necessarily have the same length. It is therefore necessary to provide several types of protection devices with different sizes in order to effectively protect all of the segments of the axles of a fleet of rail vehicles. The variety of devices needed is further increased when the fleet is made up of vehicles with different types of wheel axles.

BRIEF DESCRIPTION OF THE INVENTION

There is therefore a need for a device for protecting a wheel axle from impacts that is easily adaptable to different types of axles.

To that end, the invention relates to a wheel axle for a vehicle, the axle comprising a shaft extending along a main axis, a first protection device and at least one second protection device, each device comprising a body at least partially surrounding the shaft in a plane perpendicular to the main axis, the body having a first end portion and a second end portion, the end portions being opposite one another along their main axis. The first end portion of the first device at least partially surrounds the second end portion of the second device in a plane perpendicular to the main axis.

Owing to the invention, the protection devices may be suitable for protecting shaft segments with varying lengths by modifying the length over which the first end portion of the first device surrounds the second end portion of the second device, while the length of the shaft portions used to fasten the devices may be reduced.

According to other advantageous aspects of the invention, the axle comprises one or more of the following features, considered alone or according to any technical possible combinations:
- the body of each device comprises two half-shells, each half-shell being substantially semi-cylindrical.
- the two half-shells are identical to one another.
- the two half-shells are fastened to one another by snapping.
- the first end portion and the second end portion each have a cylindrical shape with an annular base.
- the first end portion has a first length along the main axis and the second end portion has a second length along the main axis, the first length and the second length each being greater than or equal to 2 centimeters.
- the first end portion has a first outer diameter and a first inner diameter, the second end portion has a second outer diameter and a second inner diameter, the difference between the first inner diameter and the second outer diameter being greater than or equal to 10 millimeters.
- the body comprises a gripping portion defined along the main axis by the first end portion and the second end portion, the device further comprising a collar gripping the gripping portion against the shaft.
- the gripping portion has a third inner diameter strictly smaller than the second inner diameter.

The invention also relates to a vehicle including at least one wheel axle as previously defined.

Other aspects and advantages of the invention will appear upon reading the following description, provided solely as a non-limiting example, and done in reference to the appended drawings.

DETAILED DESCRIPTION OF THE INVENTION

Figure 1:
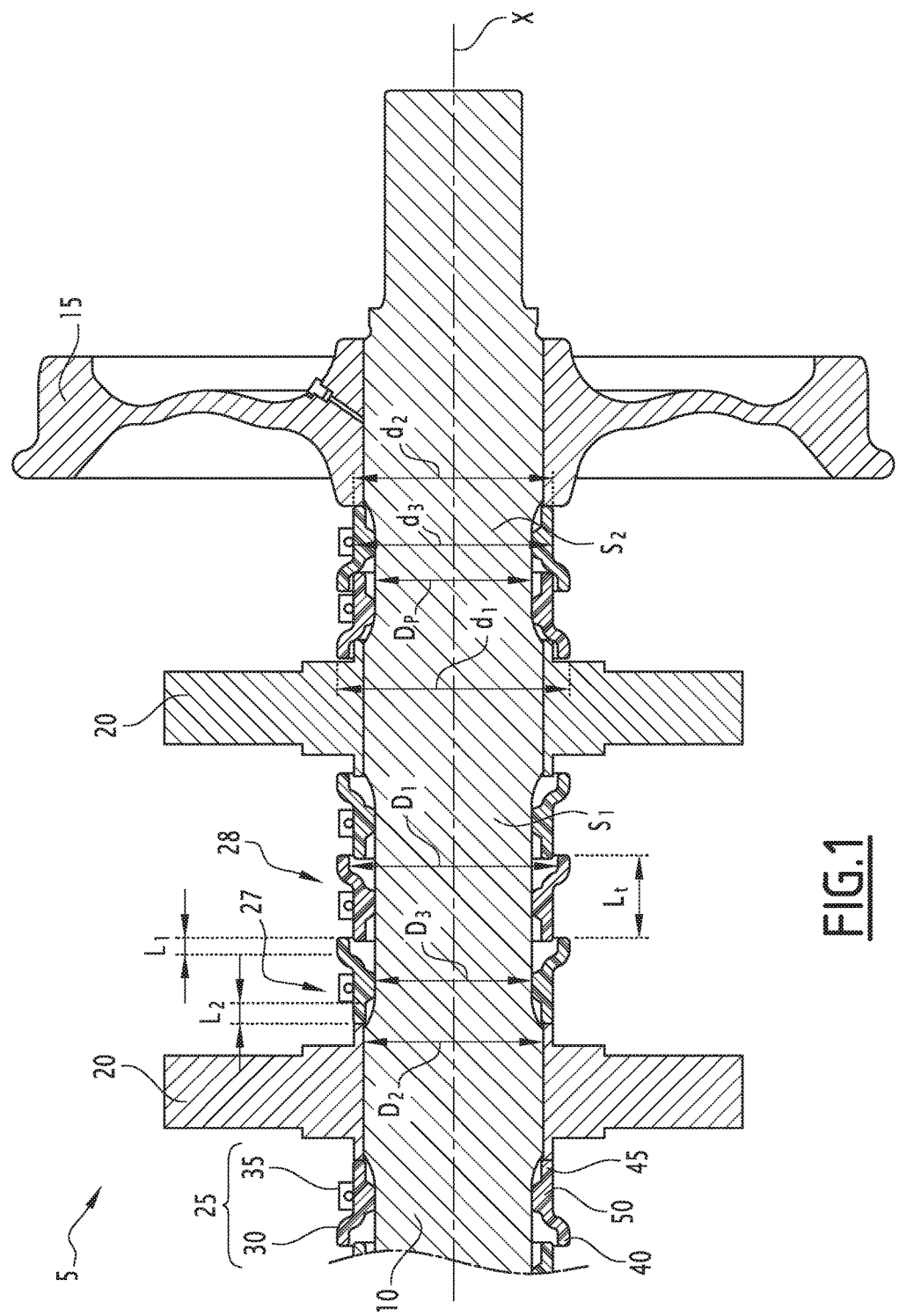
FIG. 1 is a partial sectional view of a wheel axle comprising a plurality of protection devices, each device comprising a body and a gripping collar.

A wheel axle 5 of a rail vehicle is shown in FIG. 1. The wheel axle 5 comprises a shaft 10, two wheels 15 (only one of which is shown in FIG. 1), at least two brake discs 20 and a plurality of protection devices 25.

The shaft 10 extends along a main axis X. Preferably, the shaft 10 is cylindrical with a circular base around the main axis X.

The shaft 10 is for example made from steel.

According to the embodiment shown in FIG. 1, the shaft 10 includes a first segment S1 and a second segment S2. It is understood that the shaft 10 is divided into more than two segments over the entire length thereof, only part of the shaft 10 being shown in FIG. 1.

The first segment S1 is defined along the main axis X by the two discs 20, i.e., the first segment S1 extends between the two discs 20. The first segment S1 has a main diameter Dp. For example, the main diameter Dp is equal to 175 millimeters (mm).

The second segment S2 is defined along the main axis X by the wheel 15 and the disc 20 closest to the wheel 15, i.e., the second segment S2 extends between the wheel 15 and the closest disc 20. The second segment S2 has a diameter equal to the main diameter Dp.

The plurality of devices 25 comprises a first device 27 and at least one second device 28. In FIG. 1, the wheel axle 5 comprises seven devices 25 for the part of the shaft 10 shown in this figure. The wheel axle 5 in fact comprises as many devices 25 as necessary to protect the entire shaft 10, as will be described later.

Each device 25 is identical to the other devices 25.

Each device 25 comprises a body 30 and a collar 35.

The body 30 at least partially surrounds the shaft 10 in a radial plane perpendicular to the main axis X. Preferably, the body 30 completely surrounds the shaft 10.

The body 30 includes a first end portion 40, a second end portion 45 and a gripping portion 50 extending between the first 40 and second 45 end portions.

The body 30 is made from a plastic material such as high-density polyethylene.

The body 30 has a total length Lt measured along the main axis X between the respective ends of the first end portion 40 and the second end portion 45. The total length Lt is for example equal to 95 mm.

The first end portion 40 and the second end portion 45 are opposite one another along the main axis X. The gripping portion 50 is defined along the main axis X by the first end portion 40 and the second end portion 45.

The gripping portion 50 has an inner face 62 in contact with the shaft 10. The inner face 62 has a plurality of slots 65 and a plurality of beads 70.

The gripping portion 50 is configured so that each bead 70 is in contact with the shaft 10 when the device 25 is gripped on the shaft 10.

According to the example of FIG. 1, the first end portion 40 is in the form of a skirt extending from the gripping portion 50, i.e., the body 30 flares from the gripping portion 50 to the first end portion 40.

The first end portion 40 includes a terminal part 72. The terminal part 72 is the part of the first end portion 40 that is furthest, along the main axis X, from the second end portion 45. The terminal part 72 has a cylindrical shape with an annular base around the main axis X.

Alternatively, the first end portion 40 is conical with a circular base around the main axis X.

The first end portion 40 has a first inner diameter D1 and a first outer diameter d2. The first inner diameter D1 and the second inner diameter D2 are respectively the outer and inner diameters of the terminal part 72.

The first inner diameter D1 is strictly larger than the main diameter Dp. The first inner diameter D1 is for example equal to 230 mm.

The first outer diameter d1 is for example equal to 255 mm.

The first end portion 40 has a first length L1 along the main axis X.

The first length L1 is greater than or equal to five times the total length Lt. The first length L1 is for example greater than or equal to two centimeters (cm).

The second end portion 45 is cylindrical with an annular base around the main axis X.

The second end portion 45 has a second inner diameter D2 and a second outer diameter d2.

The second inner diameter D2 is larger than or equal to the main diameter Dp, for example strictly larger. For example, the second inner diameter D2 is equal to 200 mm.

The second outer diameter d2 is strictly smaller than the first inner diameter D1. Preferably, the difference between the second outer diameter d2 and the first inner diameter D1 is greater than or equal to 10 mm.

The second end portion 45 has a second length L2 along the main axis X.

The second length L2 is greater than or equal to five times the total length Lt. The second length L2 is for example greater than or equal to 2 cm. Preferably, the second length L2 is equal to the first length L1, to within 10 percent (%).

The gripping portion 50 has a third inner diameter D3. The third inner diameter D3 is measured between the closest points of two beads 70 opposite one another along a direction perpendicular to the main axis X.

The third inner diameter D3 is larger than or equal to the main diameter Dp, preferably equal to the main diameter Dp.

The third inner diameter D3 is strictly smaller than the second inner diameter D2. This means that when the gripping portion 50 is gripped against the shaft 10, the second end portion 45 is not in contact with the shaft 10.

For example, the third inner diameter D3 is equal to the inner diameter Dp.

Preferably, the gripping portion 50 and its inner diameter D3 are configured so that, when the body 30 surrounds the shaft 10 but the gripping portion 50 is not gripped by the collar 35 on the shaft 10, the body 30 is translatable along the main axis X around the shaft 10.

The gripping portion 50 has a third outer diameter d3. The third outer diameter d3 is for example equal to the second outer diameter d2. The body 30 therefore has, on the outside, the form of a cylindrical trunk comprising a skirt at one end flaring from the trunk.

Each slot 65 extends parallel to the main axis X. Each slot 65 is therefore able to be crossed through by a stream of a fluid F oriented parallel to the main axis X. For example, the slot 65 is cylindrical with a circular base around a secondary axis A.

The secondary axis A is parallel to the main axis X.

Each slot 65 is defined along a direction tangential to the shaft 10 by two beads 70. The term "tangential direction" refers to a direction perpendicular to a straight line segment connecting the main axis X of the shaft 10 and the secondary axis A of the slot 65.

Each bead 70 is cylindrical with a circular base around an axis parallel to the main axis X.

Figure 2:
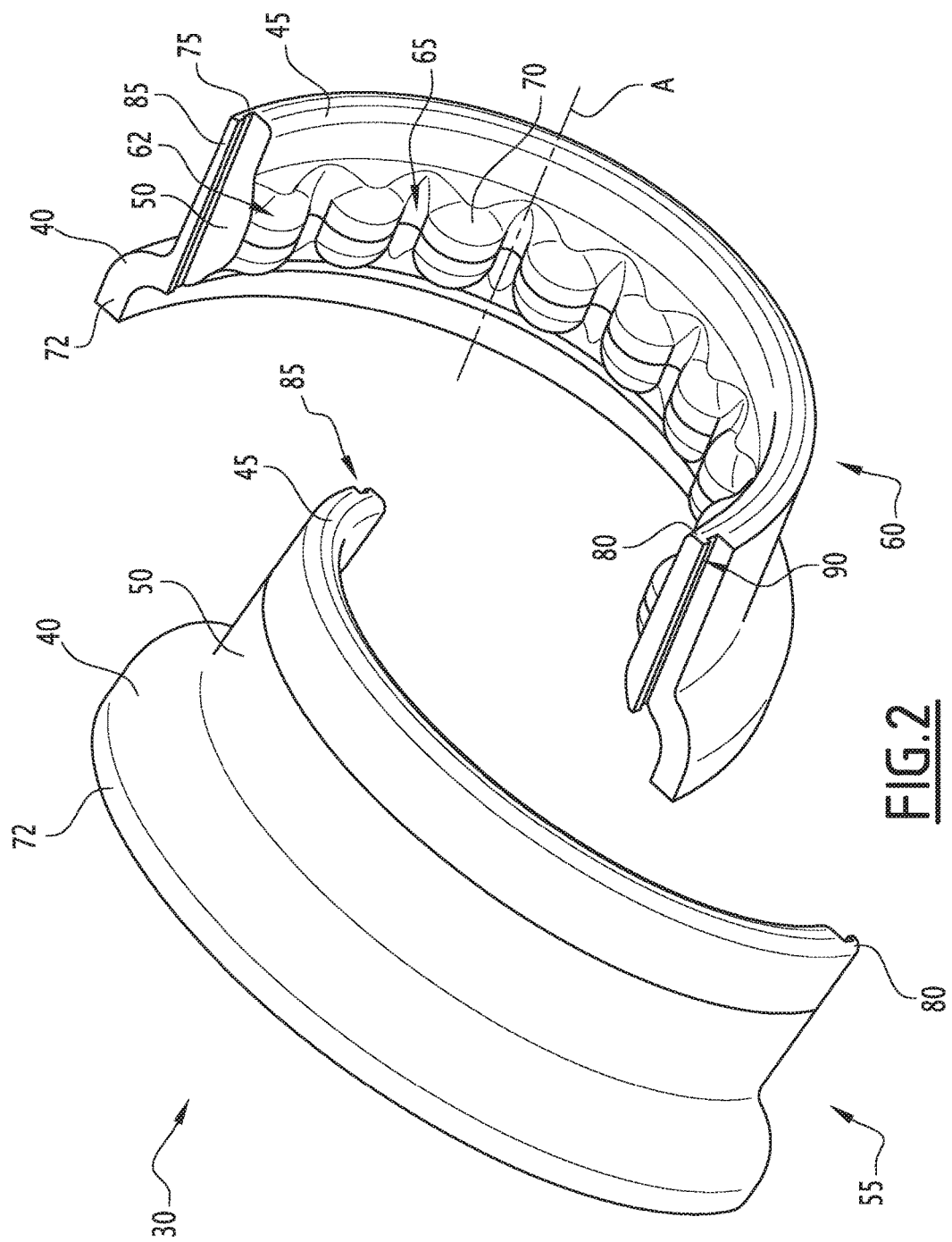
FIG. 2 is an exploded perspective view of the body of a protection device of the type shown in FIG. 1.

The body 30 comprises a first half-shell 55 and a second half-shell 60, which are shown in FIG. 2. The body 30 is formed by the union of the two half-shells 55, 60, allowing easy placement of the body 30 around the shaft 10.

Each half-shell 55, 60 is substantially semi-cylindrical. This means that each half-shell is able to surround the shaft 10 over an angle equal to 180 degrees (°), to within 15°.

Preferably, the two half-shells 55, 60 are identical to one another.

The two half-shells 55, 60 are fastened to one another in an axial assembly plan, i.e., in a plane containing the main axis X.

Each half-shell 55, 60 includes a first edge 75 and a second edge 80. Each edge 75, 80 extends parallel to the main axis X from the first end portion 40 to the second end portion 45.

The first edge 75 and the second edge 80 are configured so that, when the first half-shell 55 and the second half-shell 60 are fastened to one another, the first edge 75 of each half-shell 55, 60 is in contact with the second edge 80 of the other half-shell 55, 60.

The first edge 75 comprises first fastening means 85.

The second edge 80 comprises second fastening means 90.

The first fastening means 85 of each half-shell 55, 60 are able to collaborate with the second fastening means 90 of the other half-shell 55, 60 to fasten the first half-shell 55 to the second half-shell 60. Preferably, the first fastening means 85 are able to collaborate with the second fastening means 90 by snapping.

According to the example of FIG. 2, the first fastening means 85 assume the form of a tongue 85 and the second fastening means 90 assume the form of a groove 90 in which the tongue 85 is inserted.

The assembly of the wheel axle 5 by an operator will now be described.

The first half-shell 55 and the second half-shell 60 of the first device 27 are fastened to one another around the first segment S1 by snapping to form the body 30 of the first device 27.

The body 30 of the first device 27 is then in a first position in which the first device 27 abuts against a disc 20.

The first half-shell 55 and the second half-shell 60 of the second device 28 are next fastened to one another around the shaft 10 by snapping to form the body 30 of the second device 28.

The body 30 of the second device 28 is translated by the operator to a second position in which the first end portion 40 of the first device 27 surrounds at least part of the second end portion 45 of the second device 28. In particular, the terminal part 72 of the first device 27 surrounds at least part of the second end portion 45 of the second device 28.

An overlap length is defined for the first device 27 and the second device 28. The overlap length is the length, measured along the main axis X, over which the second end portion 45 of the second device 28 is surrounded by the first end portion 40 of the first device 27.

The second portion is chosen by the operator based on the overlap length desired by the operator.

Since the second outer diameter d2 is strictly smaller than the first inner diameter D1, there is therefore an annular opening between the first end portion 40 of the first device 27 and the second end portion 45 of the second device 28.

These steps are repeated for each device 25 equipping the shaft 10. In particular, the wheel axle 5 is equipped by the operator with as many devices 25 as necessary to protect each of the segments S1, S2 of the shaft 10 over their entire length.

Each body 30 is next gripped on the shaft 10 by its respective collar 35. The collar 35 surrounds the gripping portion 50 in a plane perpendicular to the main axis X.

During the placement by an operator of the devices 25 around the axis 10, the overlap length is chosen by the operator. A same number of devices 25 can therefore be used to protect shafts 10 with different lengths from impacts. The device 25 is therefore more adaptable than the protection devices 25 of the state of the art. Furthermore, since the gripping portion 50 occupies a reduced portion of the shaft 10, it is easily possible to consider adding protection devices 25 on the shaft 10 if the latter has a particularly significant length. Furthermore, it is possible to adapt the number of protection devices 25 to the length of the segment S1, S2 on which the devices 25 are fastened, i.e., for a very short segment, a single device 25 may be provided to cover that segment.

The invention therefore makes it possible, with a single base part, to cover a maximum surface area of the shaft 10. For example:

a single protection device 25 protects a segment with a length equal to 95 mm.
   two protection devices 25 protect a segment with a length comprised between 170 and 190 mm,
   three protection devices 25 protect a segment with a length comprised between 245 and 285 mm,
   four protection devices 25 protect a segment with a length comprised between 320 and 380 mm,
   five protection devices 25 protect a segment with a length comprised between 395 and 475 mm, and
   six protection devices 25 protect a segment with a length comprised between 470 and 570 mm.

Furthermore, if the wheel axle 25 becomes wet, the water easily circulates through the slots 65 and is discharged through the opening remaining between the first end portion 40 of the first device 27 and the second end portion 45 of the second device 28. The device 25 therefore makes it possible to limit the risks of corrosion of the shaft 10.

Furthermore, since the two half-shells 55, 60 are fastened to one another by snapping, the respective positions of each device 25 are easy to adjust. The device 25 is therefore easy to place.

The invention claimed is:

1. A wheel axle for a vehicle, the wheel axle comprising a shaft extending along a main axis, a first protection device and at least one second protection device, each device comprising a body at least partially surrounding the shaft in a plane perpendicular to the main axis, the body having a first end portion and a second end portion, the end portions being opposite one another along the main axis, wherein the first end portion of the first device at least partially surrounds the second end portion of the second device in a plane perpendicular to the main axis.

2. The wheel axle according to claim 1, wherein the body of each device comprises two half-shells, each half-shell being substantially semi-cylindrical.

3. The wheel axle according to claim 2, wherein the two half-shells are identical to one another.

4. The wheel axle according to claim 2, wherein the two half-shells are fastened to one another by snapping.

5. The wheel axle according to claim 1, wherein the first end portion and the second end portion each have a cylindrical shape with an annular base.

6. The wheel axle according to claim 1, wherein the first end portion has a first length along the main axis and the second end portion has a second length along the main axis, the first length and the second length each being greater than or equal to 2 centimeters.

7. The wheel axle according to claim 1, wherein the first end portion has a first outer diameter and a first inner diameter, the second end portion has a second outer diameter and a second inner diameter, the difference between the first inner diameter and the second outer diameter being greater than or equal to 10 millimeter.

8. The wheel axle according to claim 1, wherein the body comprises a gripping portion defined along the main axis by the first end portion and the second end portion, the device comprising a collar gripping the gripping portion against the shaft.

9. The wheel axle according to claim 8, wherein the gripping portion has a third inner diameter smaller than the second inner diameter.

10. A rail vehicle comprising at least one wheel axle according to claim 1.

* * * * *